(12) United States Patent
Belasco (10) Patent No.: US 7,988,870 B2
(45) Date of Patent: Aug. 2, 2011

(54) WATERSHED RUNOFF TREATMENT DEVICE & METHOD

(76) Inventor: David Belasco, Garden Grove, CA (US)

( * ) Notice: Subject to any disclaimer, the term of this patent is extended or adjusted under 35 U.S.C. 154(b) by 653 days.

(21) Appl. No.: 12/156,814

(22) Filed: Jun. 5, 2008

(65) Prior Publication Data

US 2009/0039022 A1    Feb. 12, 2009

Related U.S. Application Data

(60) Provisional application No. 60/943,722, filed on Jun. 13, 2007.

(51) Int. Cl.
*E03F 5/16* (2006.01)
(52) U.S. Cl. .... 210/801; 210/114; 210/164; 210/170.03
(58) Field of Classification Search .................. 210/114, 210/121, 163, 164, 170.03, 799, 801, 747; 404/4, 5
See application file for complete search history.

(56) References Cited

U.S. PATENT DOCUMENTS

| | | | | |
|---|---|---|---|---|
| 5,297,367 | A * | 3/1994 | Sainz | 52/12 |
| 5,720,574 | A * | 2/1998 | Barella | 405/52 |
| 5,744,048 | A * | 4/1998 | Stetler | 210/803 |
| 5,958,226 | A * | 9/1999 | Fleischmann | 210/165 |
| 6,062,767 | A * | 5/2000 | Kizhnerman et al. | 405/39 |
| 6,080,307 | A * | 6/2000 | Morris et al. | 210/163 |
| 6,099,723 | A * | 8/2000 | Morris et al. | 210/170.03 |
| 6,344,519 | B1 * | 2/2002 | Rink et al. | 525/97 |
| 6,562,233 | B1 * | 5/2003 | Schilling et al. | 210/164 |
| 2005/0072738 | A1 * | 4/2005 | Weir | 210/691 |

* cited by examiner

*Primary Examiner* — Terry K Cecil (57) ABSTRACT

A watershed runoff treatment device is adapted to be used to convert a single-stage drain inlet vault (catch basin) into a two-stage clarifier in which treatment can be accomplished before discharging the water to further on-site treatment or detention or to storm drain. It includes a flow control box member to be mounted on the interior of the vault covering the discharge pipe(s) so that substantially all water runoff entering the vault must flow therethrough prior to exiting the vault. Floating, disposable hydrocarbon collection pads are deployed inside an open mesh container removably attached and covering the upstream face of the flow control box, as well as below the horizontal filter array described next. A horizontal filter array with removable, cleanable filter media is deployed below the flow control box for collection of suspended solids gravity-settling within the vault space, and enabling standing water in the vault interior to gravity flow through the permeable filter and suspended solids and automatically discharge from the vault, thus providing mosquito control and de-watering of solids for easy removal.

9 Claims, 7 Drawing Sheets

WATERSHED RUNOFF TREATMENT DEVICE & METHOD

RELATED PATENT APPLICATIONS & INCORPORATION BY REFERENCE

This application claims the benefit under 35 USC 119(e) of U.S. provisional patent application Ser. No. 60/943,722, entitled "Watershed Runoff Treatment Device & Method," filed Jun. 13, 2007. This related application is incorporated herein by reference and made a part of this application. If any conflict arises between the disclosure of the invention in this utility application and that in the related provisional application, the disclosure in this utility application shall govern. Moreover, the inventors incorporate herein by reference any and all U.S. patents, U.S. patent applications cited or referred to in this application or cited or referred to in the U.S. patents and U.S. patent applications incorporated herein by reference.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

The word "rectangular" includes square.

BACKGROUND OF THE INVENTION

Devices commonly referred to as "drain inlet inserts" or "catch basin inserts" now find increasing use as a Best Management Practice (BMP) to meet the compliance requirements of environmental regulations which mandate that on new developments or construction modifications above a specified size, certain contaminants, such as Trash, Total Suspended Solids (TSS) or Total Oil & Grease (TOG) should not be discharged post-development in concentrations exceeding pre-development levels. Devices are generally available to satisfy the requirements for trash discharge control, but control of smaller, more complex suspended solids and hydrocarbon-based contaminants require equipment that is more complex and expensive, so much so, that the trend for some time has been for property developers to use drain inlet inserts which can be fitted into even the smallest sizes of drain inlet vaults. Examples of such inserts are disclosed by Abtech (U.S. Pat. No. 6,344,519), DrainPac (U.S. Pat. No. 6,562,233), and Fossil Filter (U.S. Pat. Nos. 5,720,574; 5,744,048; 5,958,226; 6,080,307; 6,099,723). These inserts can be efficient for trash removal and less so for smaller sizes of TSS particulate or TOG, but they are less expensive, readily available, and since standards for acceptability of such BMP's have not yet been fully promulgated or adopted, are not prohibited by many city/county plan check functions. Devices most efficient for capture of contaminants will be those that function as a gravity clarifier, allowing TSS to settle to the bottom of a water-detaining container and TOG to float to the surface of water standing in such a container where it can be collected by a hydrocarbon sorbent media. Providing these capabilities is not only more expensive, but also introduces an additional problem which is beginning to limit use of the most efficient hydraulic drain inlet insert devices, such as the Hydro-Cartridge (U.S. Pat. No. 5,297,367). Namely, the problem of such standing water providing an environment for mosquito growth. Now that West Nile Virus has been identified across the country as a serous potential health hazard, Vector Control Agencies are actively discouraging the use of drain inlet vault inserts which operate with standing water.

SUMMARY

This device and method has one or more of the features depicted in the embodiments discussed in the section entitled "DETAILED DESCRIPTION OF SOME ILLUSTRATIVE EMBODIMENTS." The claims that follow define this device and method in terms that distinguish it from the prior art and point out its non-obviousness characteristics; however, without limiting the scope of this invention as expressed by these claims, in general terms, some, but not necessarily all, of the features are:

One, this device is adapted to be installed in a drain inlet vault so water flows through the device and exits the vault through an outlet in a sidewall of the vault. The outlet has a predetermined vertical dimension that establishes within the vault, when water fills the vault, a maximum water level and minimum water level. This device allows water to flow therethrough at a maximum flow rate and at one or more treatment flow rates substantially slower than said maximum flow rate. The device may have a maximum flow rate that is at least 5 times that of the treatment flow rate.

Two, this device has a flow control chamber including permeable weir member on at least partially open inlet side of the chamber. The permeable weir member may be removeably mounted. The outlet pipe(s) have a predetermined cross-sectional area and the inlet pathway through the chamber has a cross-sectional area that enables water flow at least twice that of the outlet pipe(s).

Three, the flow control chamber may also include an exit opening on an outlet side of the chamber, and an internal flow diverting member between the inlet side and the outlet side. For example, the outlet side may be essentially entirely absent of any wall structure forming the exit opening. This facilitates aligning the exit opening with the vault outlet.

Four, when the chamber is attached to the sidewall, the permeable weir member and flow diverting member are substantially vertically oriented, the exit opening is aligned with the outlet in the vault sidewall so that essentially all the water flowing in the vault may flow through the chamber, and the internal flow diverting member is upstream of the exit opening so that water is diverted in a downward direction around the flow diverting member prior to rising and exiting through the exit opening, to discharge via the outlet pipe(s).

Five, the device may include a hydrocarbon collection media carrier housing holding floating hydrocarbon collection media and having a top which is positioned between the maximum and minimum water level. The carrier housing may be detachably connected to an exterior of the chamber next to the permeable weir member and it is open, for example perforations in the housing. It is configured so, at the treatment flow rate, water first flows through carrier housing and then through the permeable weir member upstream of the diverting member and, at the maximum flow rate, the bulk of the water flows over the top of the carrier housing and over the permeable weir member into the chamber upstream of the diverting member.

Six, the device may include a substantially horizontally oriented filter array located below the chamber and above a bottom of the vault. This provides a lower space between the array and the bottom of the vault so post-rainfall water drains by gravity through the array into said space. Floating hydrocarbon collection media may be deployed in that space to float on the surface of water that drains into the space. The filter array may comprise a plurality of modular filters, each filter including a fixed or movable bottom support screen, a hinged upper inlet screen, and a removable, cleanable filter media inserted therebetween upon which surface suspended solids will be collected by gravity deposition.

Seven, the device may include a gravity drain-down pathway to an appropriate final discharge point such as another similar drain inlet vault, an external pump sump, an infiltration or detention structure or an offsite discharge pathway. The pathway may have a piping connection inlet within the space and below the horizontal filter array. The piping connection inlet may comprise a closed end turned-down element with holes therein positioned with the space to provide a gravity discharge flow through such pipe connection to be within a predetermined flow rate range to retain the floating hydrocarbon collection media within the space.

Eight, when gravity drainage of the space is not feasible, a submersible pump may be positioned within the space. The pump may have a float control that when turned on discharges to outside the vault, water coming through the horizontal filter array into the space.

These features are not listed in any rank order nor it this list intended to be exhaustive.

This method of treating watershed runoff and this watershed drainage device is, in terms of project-life-cost, economic to install in a drain inlet vault. This storm watershed drainage device converts a single-stage catch basin vault into a two-stage gravity clarifier. By producing temporarily standing water for more efficient gravity separation and then eliminating the standing water (once rainfall and storm water runoff has slowed sufficiently). This is done in a short enough time to prevent flying mosquito development even if eggs, larvae or pupae are washed into the drain inlet vault with watershed runoff. This device enables the capture, detention, removal and disposal of contaminants contained in watershed runoff entering drain inlet vaults in which such devices have been installed to ensure compliance with environmental regulations. These functions are achieved thorough the use of gravity separation to enable collection of entrained suspended solids and sorbent media deployment for collection of floatable hydrocarbons, while at the same time preventing mosquito development in the standing water by automatically removing standing water once rainfall and storm water runoff have ceased.

This method provides for maximum possible collection of settled TSS within a single-stage drain inlet vault (catch basin) by converting the single-stage drain inlet vault into a two-stage gravity clarifier. Further, it provides for maximum collection/removal of TOG entrained in the influent water and it enables disposal of collected TOG in a Class-A landfill to be possible. Embodiments of this method also provide for inspection, determination of need for, and accomplishment of cleanout and disposal of captured contaminants from drain inlet vaults using the storm water treatment devices of this invention. Property developments using this device and method and will remain functionally compliant with governmental environmental regulations throughout the life of their land development project and minimize project-life-costs associated with such storm water treatment.

DESCRIPTION OF THE DRAWING

Some embodiments of this invention, illustrating all its features, will now be discussed in detail in connection with the accompanying drawing, which is for illustrative purposes only. This drawing includes the following figures (FIGS.), with like numerals indicating like parts.

DETAILED DESCRIPTION OF SOME ILLUSTRATIVE EMBODIMENTS

Figure 1:
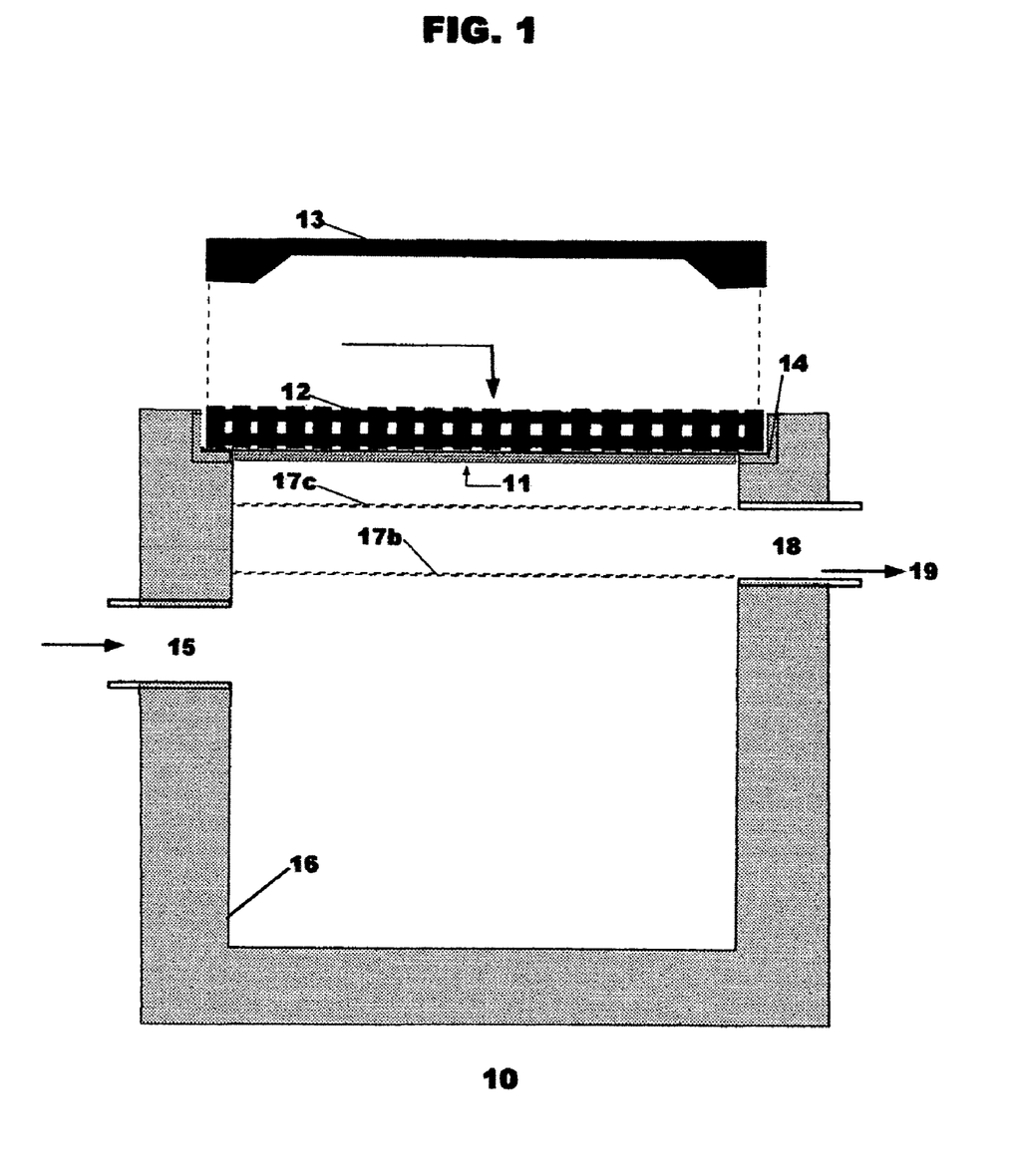
FIG. 1 is a cross-sectional view of a top/side-entry high-side-exit concrete drain inlet vault of the type in which the embodiments of this invention can typically be utilized.
Figure 4:
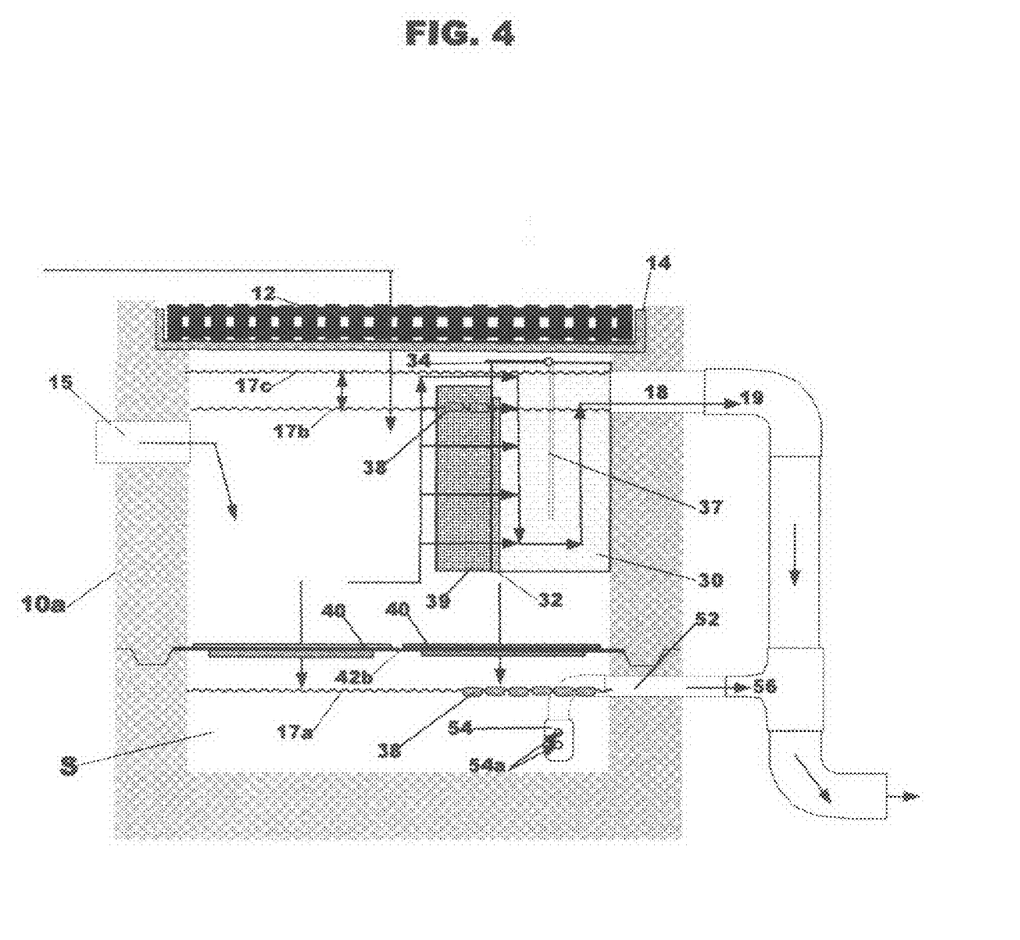
FIG. 4 is an elevation view of the device of FIG. 2 installed in the vault of FIG. 1
Figure 5:
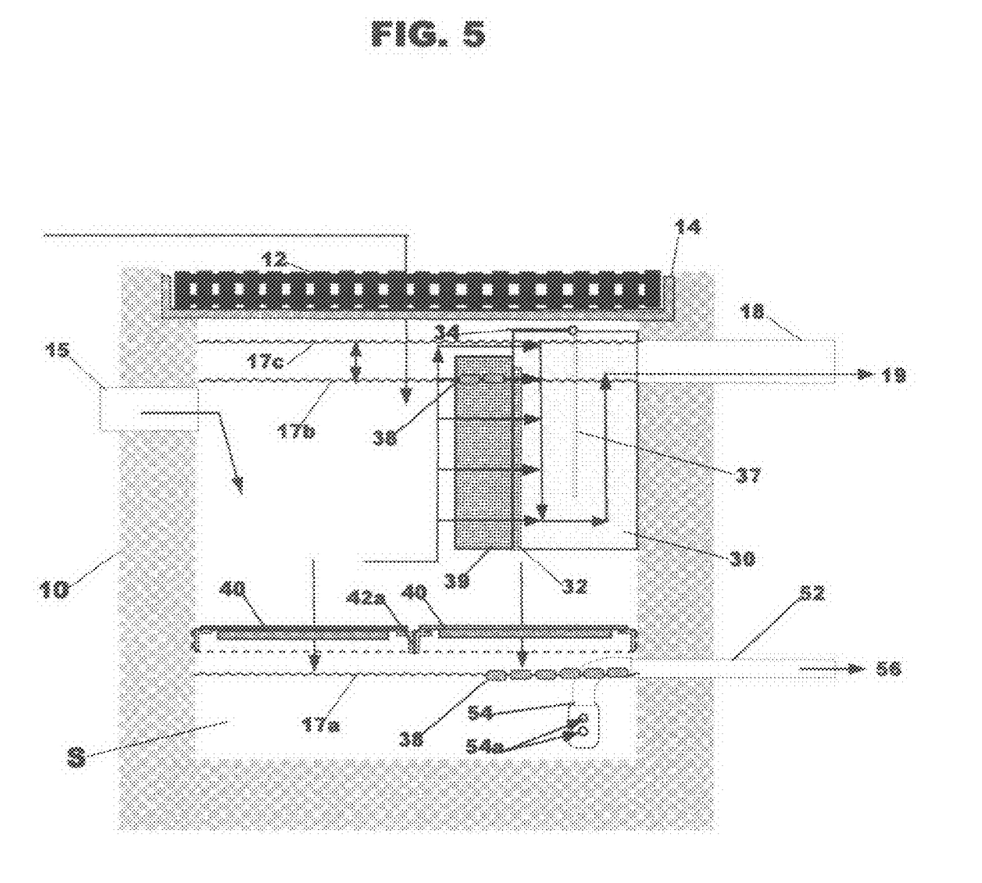
FIG. 5 is an elevation view of a second embodiment of the device of FIG. 2 installed in the vault of FIG. 1
Figure 6:
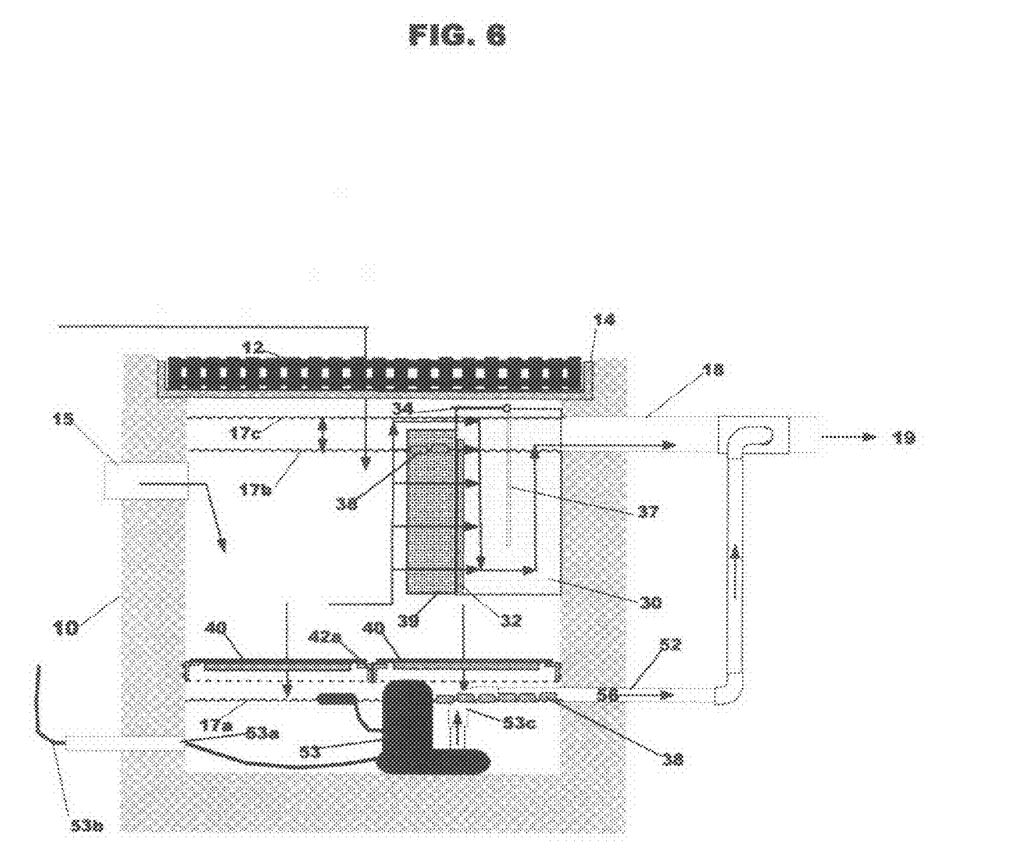
FIG. 6 is an elevation view of a third embodiment of the device of FIG. 2 installed in the vault of FIG. 1.

FIG. 1 discloses the top/side-entry, high-side-exit, concrete drain inlet vault 10 of a type in which the embodiments of this invention can typically be utilized. This type of drain inlet vault 10 consists typically, but not exclusively, of a concrete square or rectangular shaped box 16 with the open top 11 surrounded by steel angular support elements 14 which position and support grated lid(s) 12 or solid cover(s) 13. The vault 10 may have a top-entry grate 12 through which storm water runoff from the surrounding watershed enters the inlet vault 10, or it may have side-entry port(s) 15, or both. Water can enter the box 16 through the open top 11 or through pipe(s) 15 penetrating the sidewall(s) of box 16. Water can exit the box 16 through pipe(s) 18 located as high as possible in a sidewall of box 16 and become discharge 19. The water level fluctuates, with level 17b the beginning of primary discharge flow and level 17c the point of full pipe flow in pipe 18, as depicted in FIGS. 4 through 6, for example, during a rainstorm. Typically, when the water level is at 17c or higher, water is flowing at the maximum flow rate. Water eventually drains down, however, leaving standing water 17a inside, below a horizontal bottom filter array 40

Figure 2:
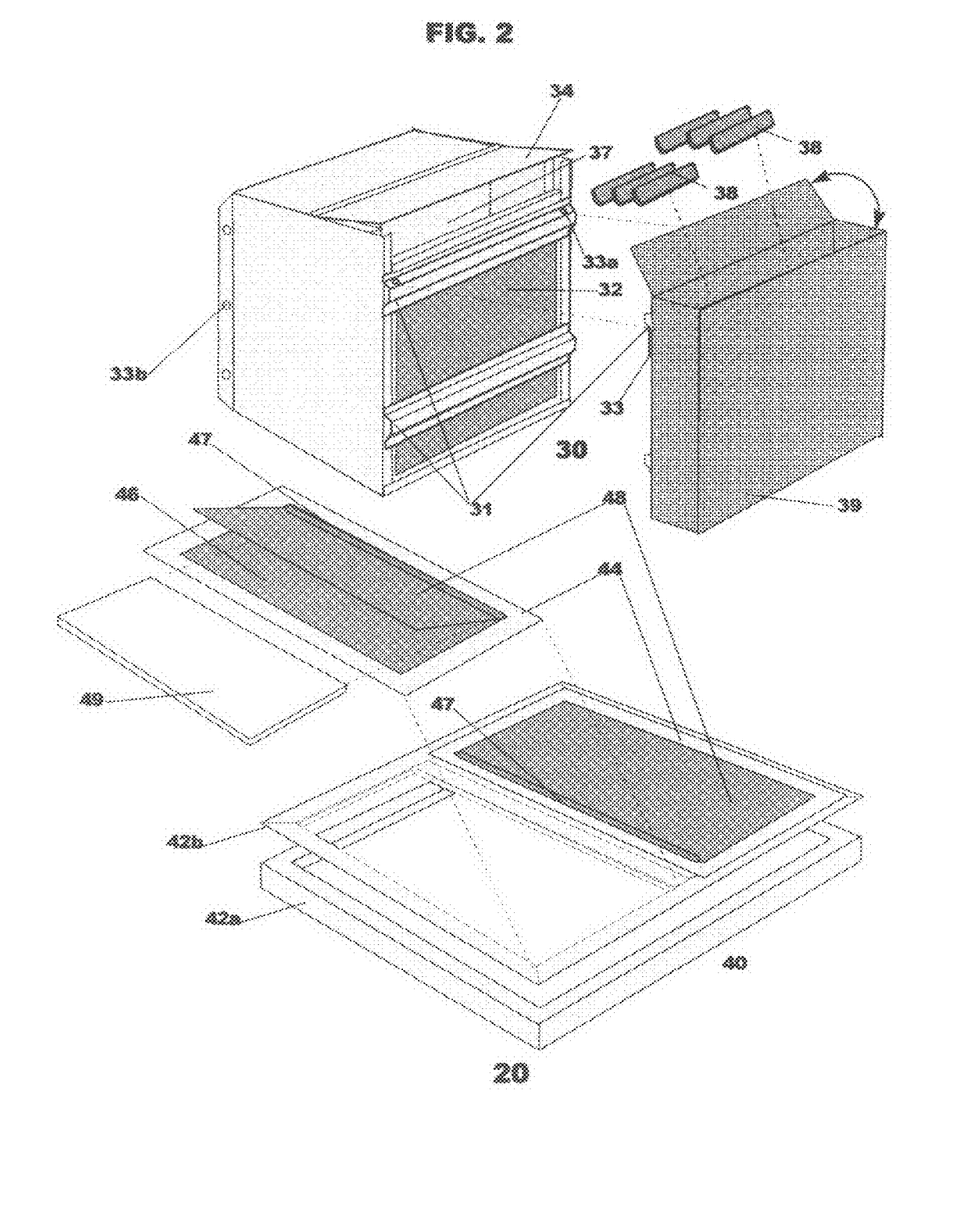
FIG. 2 is a front perspective view, with sections broken away, of one embodiment of the storm water treatment device of this invention.

FIG. 2 depicts the watershed runoff treatment device 20 to be installed in a typical drain inlet vault 10. The treatment device 20 includes a flow control chamber 30, which is to be bolted to an inside wall face of a drain inlet vault 10 covering its exit pipe(s) 18 using mounting bolt holes 33b, a permeable weir member 32, an internal flow diverting member in the form of a down-turned flow plate element 37 and a hydrocarbon sorbent media carrier housing 39 through which all water first passes until rising to a level that overflows into the flow control chamber 30.

Positioned vertically across the majority of the upstream inlet opening of the flow control chamber 30 is the permeable weir member which may be accessed for insertion and removal within its guides by lifting a hinged deflector 34 in the top of the chamber 30. Upon installation the permeable weir member 32 is vertically oriented and serves to filter suspended solids from the bulk water entering the flow control chamber 30 at normal treatment rates. At the maximum rate, the bulk of the water flows over the permeable weir member 32. After passing the permeable weir member 32, the water flows under the bottom edge of the down-turned flow element 37 and then up to reach the high-side-exit pipe(s) 18 to become primary discharge 19 from the vault 10. Floatables in the form of suspended solids or hydrocarbon-based liquids are restrained by the down-turned flow element 37 from becoming entrained in the discharge 19.

A carrier housing in the form of an open-mesh, lidded sorbent container 39, removably mounted to the upstream face of the flow control chamber 30 by, for example, engaging pins 33 into holes 33a of horizontal members 31, is used to deploy floating disposable mesh pads 38 containing sorbent particles. These mesh pads 38 function as floating hydrocarbon collection media.

Below the flow control chamber 30 is the horizontal bottom filter array 40 comprised of angle support frame 42a which is bolted to the inside wall surfaces of the vault 10 to provide support for filter frame(s) 44, lower media support mesh 46, hinge(s) 47, upper media support mesh 48, and media 49 which comprise the elements of the bottom filter array 40. The bottom filter array 40 supports the load of collected suspended solids and personnel entering the vault 10 for periodic inspection or removal of solids. The inherent permeability of collected solids enables gravity drain-down of standing water within the vault 10, once storm water runoff has ceased, in less than three days. Standing water will collect in the space S below the filter array 40 as shown in FIGS. 4, 5 and 6. If the measures disclosed herein are not employed, standing water will remain standing above the filter array 40 and mosquitoes may breed in such standing water.

Figure 2A:
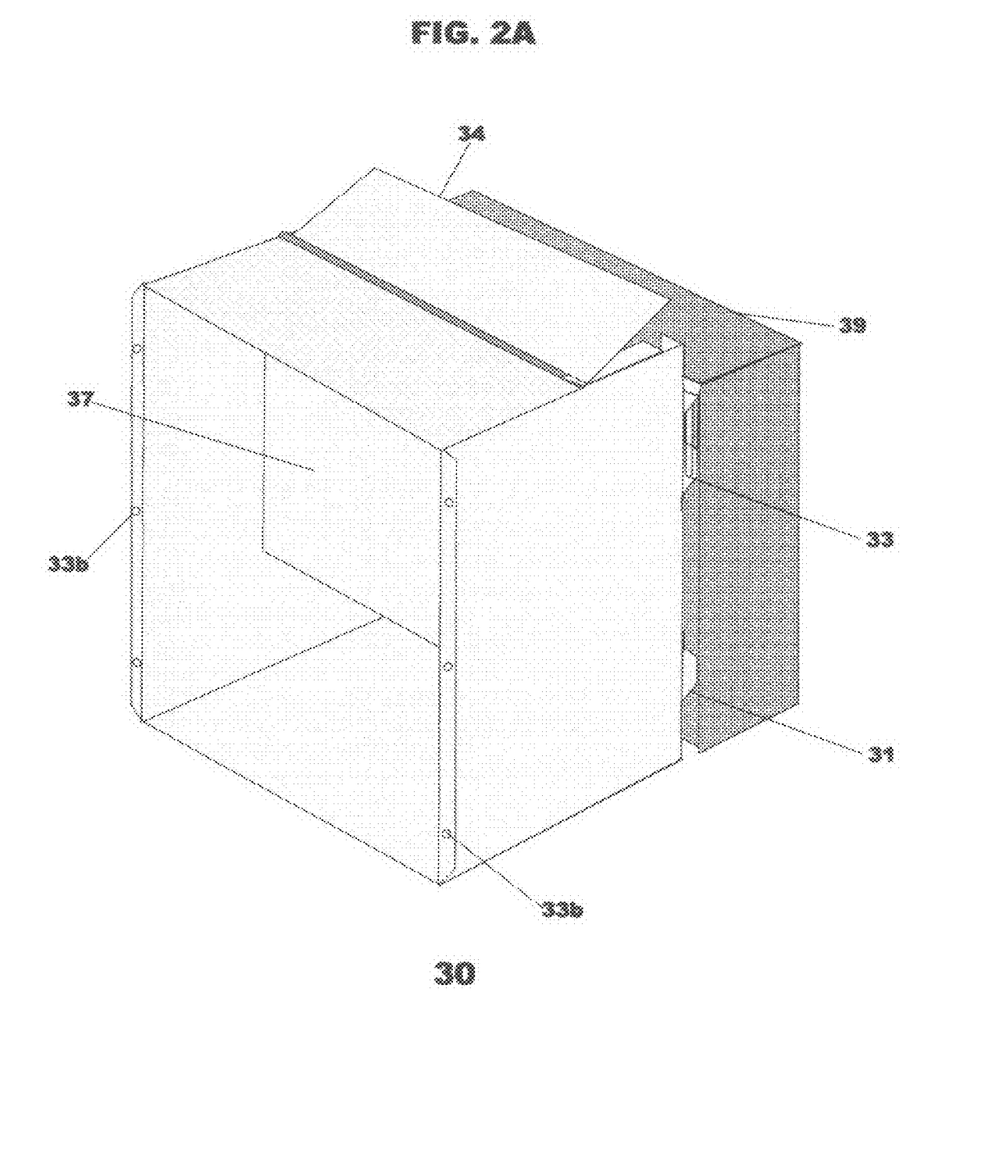
FIG. 2A is a rear perspective view of the flow control chamber and hydrocarbon collection media carrier of the embodiment of the storm water treatment device shown in FIG. 2.

FIG. 2A is a rear perspective view of the embodiment of the flow control chamber 30 and carrier housing 39 depicted in FIG. 2.

Figure 3:
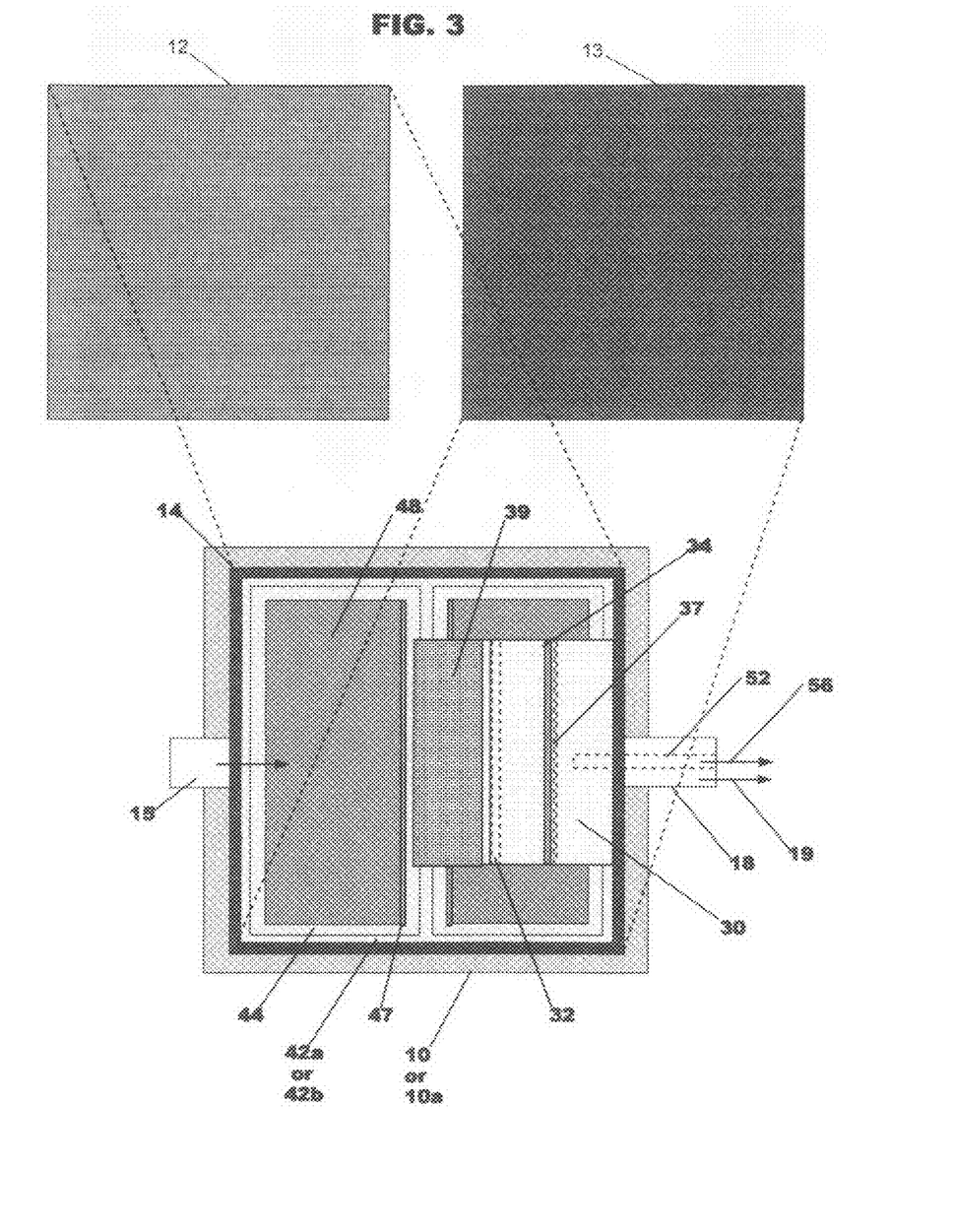
FIG. 3 is a plan view of the device of FIG. 2 in the vault of FIG. 1

FIG. 3 is a plan view, with elements broken away, of the device 20 of FIG. 2 installed in the vault 10 FIG. 1.

An automatic drain-down of standing water is depicted in FIGS. 4, 5 and 6.

FIG. 4 depicts one embodiment for accomplishing automatic drain-down, in this depiction using the vault 10a configuration, by combining the primary discharge 19 with bottom cavity gravity drainage 56 via down-turned inlet control 54 into drain line 52 into connection with drain line 18 which continues by gravity to an appropriate destination, either continued on-site treatment or off-site discharge. Holes 54a in an end of drain line 52 allow water in the space S to merge into the primary discharge 19.

FIG. 5 depicts another embodiment for accomplishing automatic drain-down, in this depiction using the vault 10 configuration, by piping the primary discharge pipe 18 and discharge 19 to gravity flow to an appropriate destination, either continued on-site treatment or off-site discharge, and separately connecting bottom cavity drain-down via gravity drain pipe 52 and drain-down flow 56 to a remote infiltration or detention chamber, dry-well, pump sump or off-site.

FIG. 6 depicts another embodiment for accomplishing automatic drain-down, in this depiction using the vault 10 configuration, by piping the primary discharge pipe 18 and discharge 19 to gravity flow to an appropriate destination, either continued on-site treatment or off-site discharge, and separately connecting bottom cavity drain-down by installing a float controlled electrical submersible pump 53 below the horizontal bottom filter array 40, with electrical power feed 53b entering vault 10 via pipe 53a and discharge water leaving vault 10 via pump adapter fittings 53c to enter pipe 52 which, in this embodiment is connected to pipe 18 and follows the path of discharge 19.

This watershed runoff treatment device and method is adapted to be used to convert a single-stage drain inlet vault (catch basin) to function as a two-stage gravity clarifier. The following embodiments illustrate this method and storm water treatment device, which may include (a) means adapted to be mounted on an interior wall of a drain inlet vault covering the primary discharge outlet pipe(s) to cause substantially all water runoff entering the vault to flow therethrough prior to exiting the vault,
(b) means removeably mounted to the upstream side of (a), above, for deployment of floating, disposable mesh pads filled with sorbent for the collection of hydrocarbon contaminants
(c) means mounted to the ID walls of the vault below (a) above, and positioned to support removable, cleanable filter media covering the ID bottom of the vault, or a significant portion of the ID bottom thereof for collection of gravity-settled, suspended solids.
(d) means positioned in the cavity space below (c), above, to receive water penetrating the filter media of (c), above, and enable such water to exit the cavity space by gravity flow or by means of a submersible pump and, at the same time, prevent disposable sorbent pads deployed in the cavity space from exiting or interfering with the discharge of water from the cavity.
(e) means adapted to be positioned inside or outside the treatment vault space for preventing mosquito ingress/egress to/from the standing water within the vault.

After reading the above section entitled "DETAILED DESCRIPTION OF SOME ILLUSTRATIVE EMBODIMENTS" one skilled in the art will understand the benefits this invention provides, including, but not limited to: improving the efficiency of detention and capture of contaminants contained in watershed runoff which would otherwise pass through a drain inlet vault and into the storm drain system and (2) preventing the release of flying mosquitoes from such drain inlet vaults.

Scope of the Invention

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

The invention claimed is:
1. A device adapted to be installed in a drain inlet vault so water flows through the device and exits the vault through an outlet in a sidewall of the vault, said outlet having a predetermined vertical dimension that establishes within the vault, when water fills the vault, a maximum water level and minimum water level, said device allowing water to flow there through at a maximum flow rate and at one or more treatment flow rates substantially slower than said maximum flow rate, and comprising
a flow control chamber including a removably mounted permeable weir member, on at least one partially open inlet side of the chamber, an exit opening on an outlet side of the chamber, and an internal flow diverting member between the inlet side and the outlet side,
a hydrocarbon collection media carrier removably positioned on an exterior of said chamber, when the chamber is attached to the sidewall, said permeable weir member and flow diverting member being substantially vertically oriented, said opening being aligned with the outlet in the sidewall so that essentially all the water flowing in the vault flows through the flow control chamber and said internal flow diverting member being upstream of the exit opening so that water is diverted in a downward direction by the flow diverting member prior to returning to upward flow direction prior to exiting through the exit opening, and at the maximum flow rate the bulk of the water flows over the top of the media carrier housing and over the permeable weir member into the flow control chamber upstream of the diverting member.

2. The device of claim 1 where the outlet has a predetermined open area and the open inlet side has a cross-sectional flow-through area that allows, at the same head pressure, at least twice the hydraulic flow of the outlet open area.

3. The device of claim 1 where the maximum flow rate is at least 5 times that of the treatment flow rate.

4. The device of claim 1 including a substantially horizontally oriented filter array located below the chamber and above a bottom of the vault to provide a lower space between the array and the bottom of the vault so post-rainfall water drains by gravity through the array into said space.

5. The device of claim 4 where the filter array comprises a plurality of modular filters each filter including a fixed or movable bottom support screen, a hinged upper inlet screen, and a removable, cleanable filter media inserted therebetween upon which surface suspended solids will be collected by gravity deposition.

6. The device of claim 4 including floating hydrocarbon collection media deployed in the space that floats on the surface of the water that drains into the space.

7. The device of claim 6 including a gravity drain-down pathway to an appropriate discharge point, said pathway having a piping connection inlet within said space and below the horizontal filter array and comprising a close end turned-down element with holes therein positioned within the space to provide a gravity discharge flow through such pipe connection to be within a predetermined flow rate range to retain floating hydrocarbon collection media within the space and maximize liquid detention time but enable full drain-down in less than three days time from cessation of storm water runoff.

8. The device of claim 6 including in the space a submersible pump having a float control that when turned on discharges to outside the vault water coming through the horizontal filter array into said space.

9. A method of treating water run off in a vault prior to discharge to a drainage system, said method comprising the steps of:

installing in the vault an open device that enables water to flow through the device and exit the vault through an outlet in a sidewall of the vault, said outlet being sized to have a predetermined vertical dimension that establishes within the vault, when water fills the vault, a maximum water level and minimum water level, to allow water to flow there through at a maximum flow rate and at one or more treatment flow rates substantially slower than said maximum flow rate, said device having a flow control chamber including a removeably mounted permeable weir member on at least an outlet side of the chamber, and an internal flow diverting member between the inlet side and the outlet side, when the chamber is attached to the sidewall, said permeable weir member and flow diverting member being substantially vertically oriented, said opening being aligned with the outlet in the sidewall so that essentially all the water flowing in the vault flows through the chamber and said opening so that water is diverted in a downward direction by the flow diverting member and then returns to the upward flow direction downstream of the flow diverting member prior to exiting through the exit opening, and a hydrocarbon collection media carrier housing holding the floating hydrocarbon collection media and having a top which is positioned between the maximum and minimum water level, said carrier housing being detachably connected to an exterior of the chamber next to the permeable weir member and open so that at the treatment flow rate water first flows through the media carrier housing and then through the permeable weir member upstream of the diverting member and at the maximum flow rate the bulk of the water flows over the top of the media carrier housing and over the permeable weir member into the chamber upstream of the diverting member.

* * * * *